United States Patent [19]
Lampela et al.

[11] Patent Number: 5,676,226
[45] Date of Patent: Oct. 14, 1997

[54] SPRAG AND ROLLER ONE-WAY CLUTCH ASSEMBLY

[75] Inventors: Marcia L. Lampela, Chicago; Walter J. Becker, Palatine; Gregory J. Malecha, Naperville, all of Ill.

[73] Assignee: Borg-Warner Automotive, Inc., Sterling Heights, Mich.

[21] Appl. No.: 642,644

[22] Filed: May 3, 1996

[51] Int. Cl.$^6$ .................................... F16D 41/07
[52] U.S. Cl. ............... 192/45.1; 192/110 B; 192/113.32; 188/82.8
[58] Field of Search ............... 192/45.1, 41 A, 192/110 B, 113.32; 188/82.8

[56] References Cited

U.S. PATENT DOCUMENTS

| | | | |
|---|---|---|---|
| 3,049,205 | 8/1962 | Ferris et al. | 192/45.1 |
| 3,886,740 | 6/1975 | Krok | 60/341 |
| 4,130,191 | 12/1978 | Judd et al. | 192/41 A |
| 4,347,921 | 9/1982 | Bordes | 192/41 A |
| 4,360,093 | 11/1982 | Wakabayashi et al. | 192/41 A |
| 4,645,047 | 2/1987 | Adolfsson | 192/12 B |
| 4,756,395 | 7/1988 | Zlotek | 192/41 A |
| 5,002,167 | 3/1991 | Kinoshita et al. | 192/41 A |
| 5,064,037 | 11/1991 | Long, Jr. | 192/41 A |
| 5,176,232 | 1/1993 | Malecha | 192/45 |
| 5,183,139 | 2/1993 | Malecha | 192/45 |
| 5,291,978 | 3/1994 | Numata | 192/45.1 |
| 5,320,204 | 6/1994 | Riggle et al. | 192/45.1 |
| 5,363,947 | 11/1994 | Ikeda | 192/45.1 |
| 5,443,147 | 8/1995 | Gratzer | 192/27 |

*Primary Examiner*—Richard M. Lorence
*Attorney, Agent, or Firm*—Emch, Schaffer, Schaub, et al; Greg Dziegielewski

[57] ABSTRACT

A sprag and roller one-way clutch assembly (10) including an outer cage (12), an inner cage (14) and a ribbon spring (16) for use with a clutch having outer and inner races (70, 72). The outer and inner cages (12, 14) each defines a plurality of corresponding sprag and roller openings (20, 30, 22, 32). The ribbon spring (16) defines a plurality of corresponding sprag and roller windows (40, 42). A plurality of spaced sprags (50) extends between and through the corresponding sprag openings (20, 30) defined by the outer and inner cages (12, 14) and through the corresponding sprag windows (40, 42) defined by the ribbon spring (16). A plurality of spaced rollers (60) extends between the corresponding roller openings (22, 32) defined by the outer and inner cages (12, 14) and through the corresponding roller windows (42) defined by the ribbon spring (16). Each of the rollers (60) has a substantially cylindrical configuration. The rollers (60) act as bearings to support the outer and inner races (70, 72) of the clutch during rotation.

4 Claims, 4 Drawing Sheets

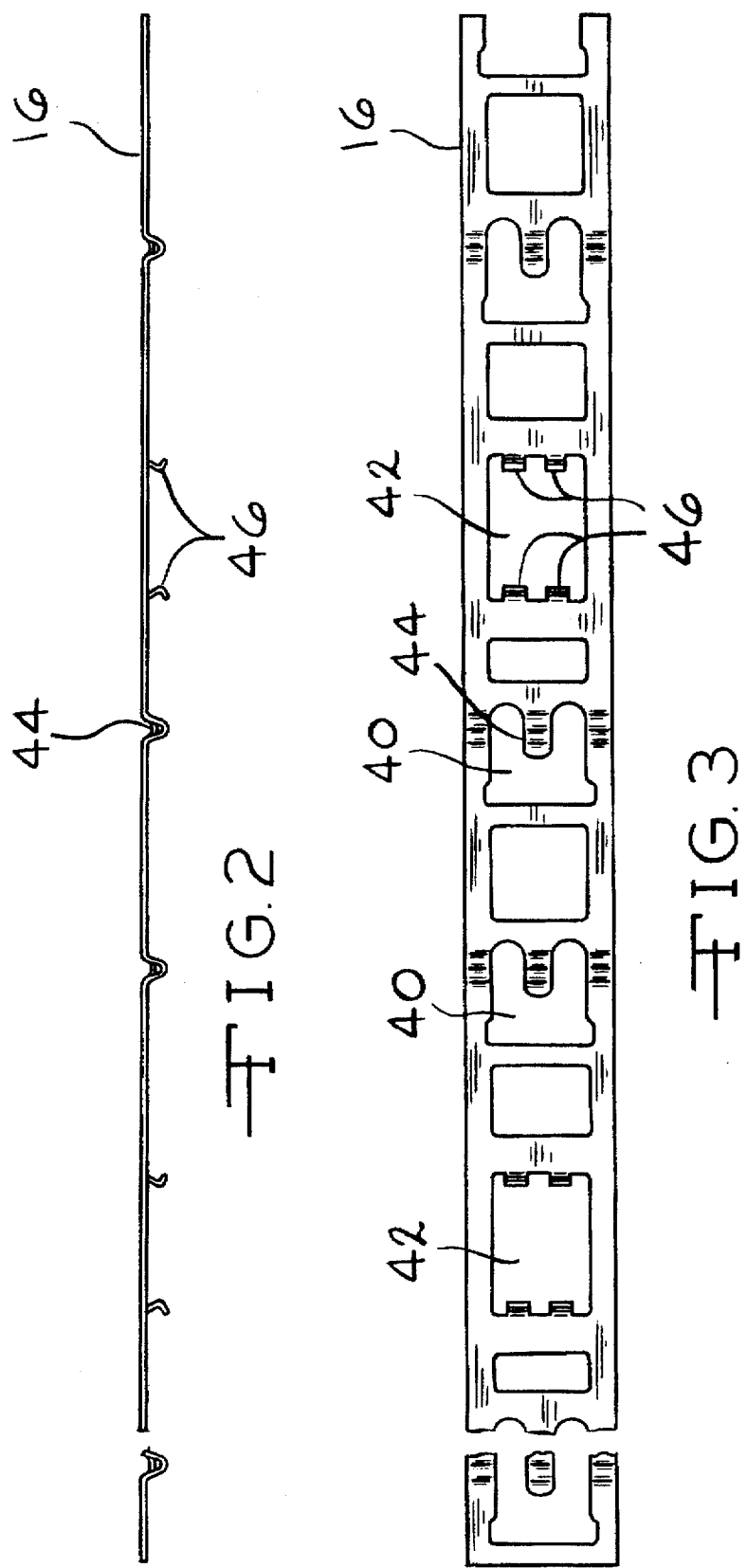

SPRAG AND ROLLER ONE-WAY CLUTCH ASSEMBLY

BACKGROUND OF THE INVENTION

The present invention relates generally to a one-way clutch assembly having a plurality of sprags and rollers. More particularly, the invention is directed to a one-way clutch assembly having an outer cage, an inner cage and a ribbon spring in which a plurality of sprags and rollers are positioned between the outer and inner cages and maintained in proper position by the ribbon spring.

Sprag one-way clutch assemblies are known in the art. Examples of such assemblies are shown in U.S. Pat. Nos. 4,130,191; 5,002,167; 4,360,093; and 5,291,978. Most prior art assemblies include a plurality of sprags positioned between an outer cage and an inner cage. A ribbon spring, such as one shown in U.S. Pat. No. 5,363,947, is positioned between the outer and inner cages to maintain the plurality of sprags in proper position with respect to the cages. The assemblies are usually positioned between an outer race and an inner race of a clutch. One or both of the races are free to rotate during freewheeling of the clutch. The sprags are movable from a freewheel position in which the outer and inner races are free to rotate and a locked position in which rotation of the races is restricted. The clutch assembly is bathed in lubricating oil that is positioned between the races to reduce friction.

It has been found that it is difficult to control the eccentricities of the outer and inner races during rotation of the prior art assemblies. It has also been found that the lubricating oil is not fully distributed between the outer and inner races during rotation. Therefore, there is a need for a one-way clutch assembly that properly controls the eccentricities of the races and redistributes the oil between the races. The present invention satisfies the above-identified needs.

SUMMARY OF THE INVENTION

The present invention is directed to a sprag and roller one-way clutch assembly for use between an outer race and an inner race of a clutch having an outer cage and an inner cage. Each of the cages defines a plurality of corresponding sprag and roller openings. A ribbon spring is positioned between the outer and inner cages, The ribbon spring defines a plurality of corresponding sprag and roller windows.

A plurality of spaced sprags extends between and through the corresponding sprag openings defined by the outer and inner cages and through the corresponding sprag windows defined by the ribbon spring. Each of the sprags is movable between a freewheel position in which the outer and inner races are free to rotate and a locked position in which rotation of the outer and inner races is restricted.

A plurality of spaced rollers extends between and through the corresponding roller openings defined by the outer and inner cages and through the corresponding roller windows defined by the ribbon spring. Each of the rollers has a cylindrical configuration. Each of the rollers acts as a bearing to support the outer and inner races during rotation of the outer and inner races.

The primary object of the present invention is to provide a sprag and roller one-way clutch assembly that controls the rotation of the outer and inner races of a clutch.

Other objects and advantages of the present invention shall become apparent to those skilled in the art upon a review of the following detailed description of the preferred embodiments and the accompanying drawings.

BRIEF DESCRIPTION OF THE DRAWINGS

FIG. 2 is a side elevational view of a ribbon spring according to the present invention;

FIG. 3 is a plan view of the ribbon spring shown in FIG. 2;

DETAILED DESCRIPTION OF THE PREFERRED EMBODIMENTS

Figure 1:
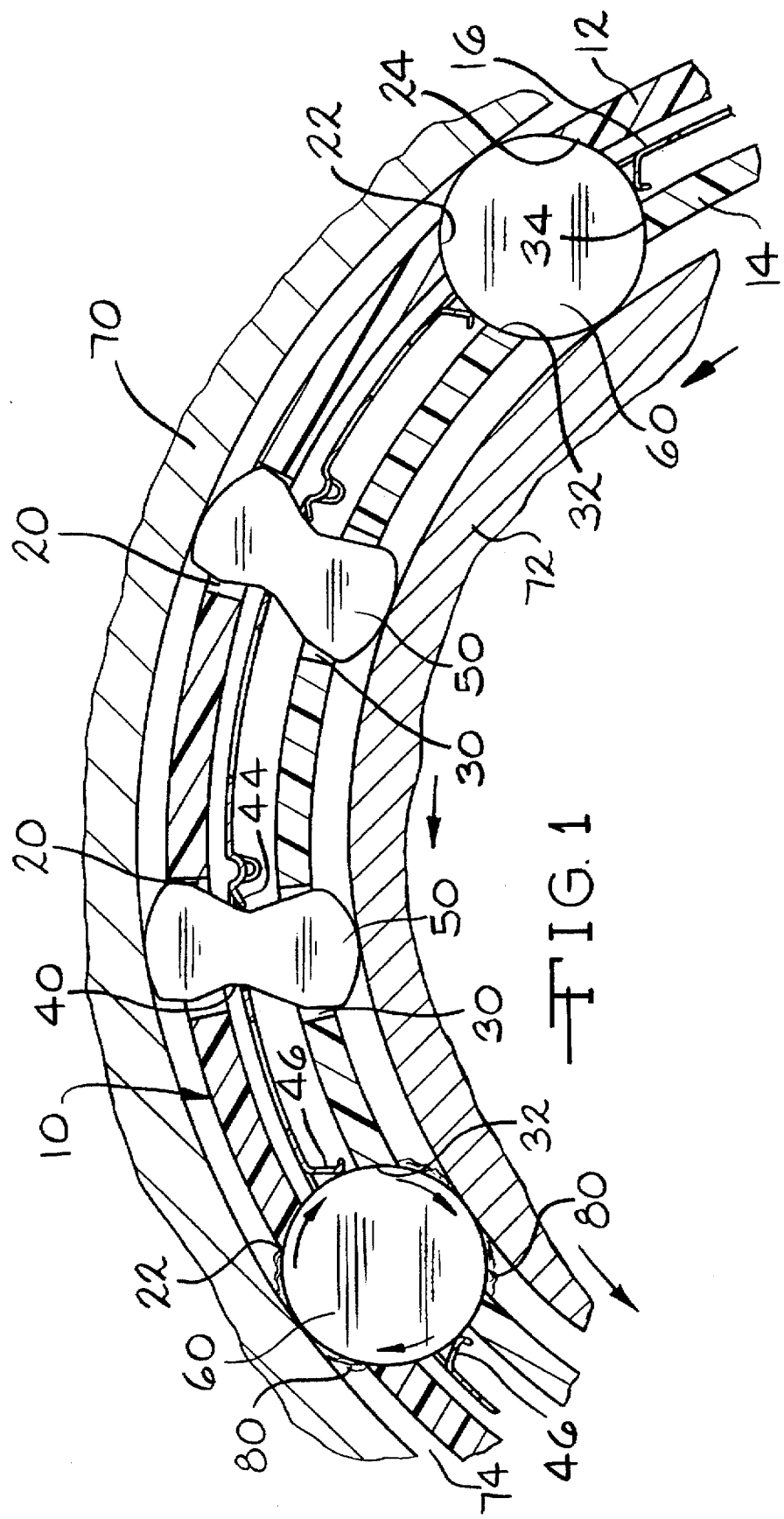
FIG. 1 is a cross-sectional view showing the sprag and roller one-way clutch assembly according to the present invention positioned between an outer race and an inner race of a clutch.

The preferred embodiments and best mode of the present invention will now be described in detail with reference being made to the drawings. The sprag and roller one-way clutch assembly of the present invention is indicated generally in the drawings by the reference number "10".

Figure 6:
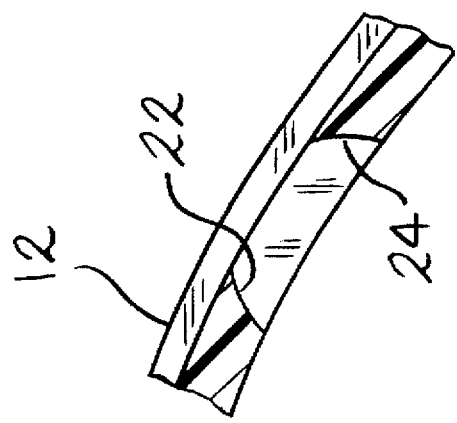
FIG. 6 is a cross-sectional view taken through line 6—6 of FIG. 4.
Figure 4:
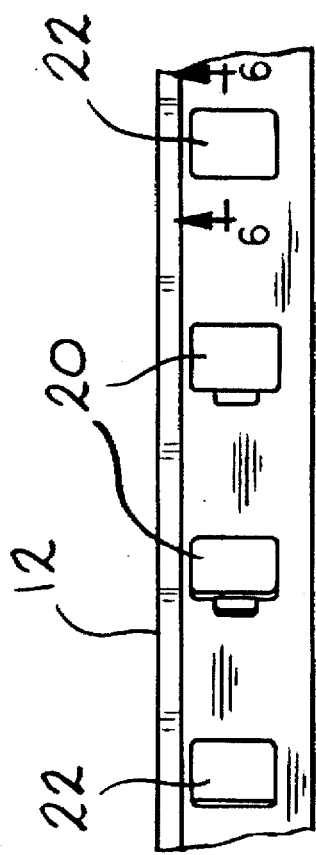
FIG. 4 is a plan view of a portion of an outer cage according to the present invention.
Figure 5:
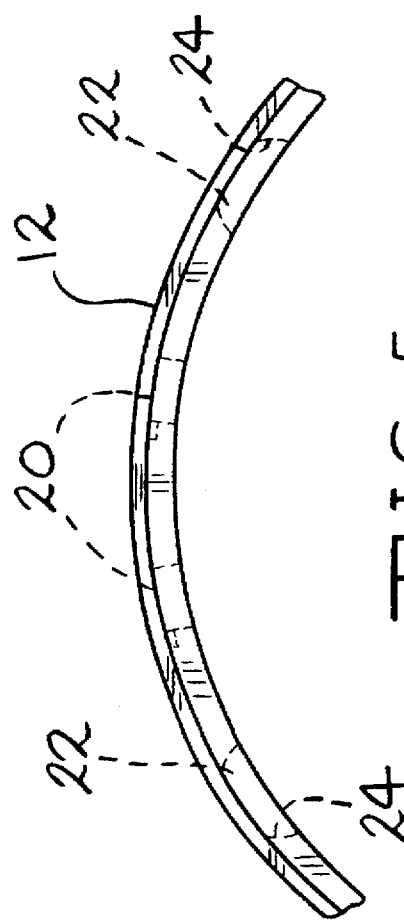
FIG. 5 is a side elevational view of a portion of the outer cage shown in FIG. 4.
Figure 7:
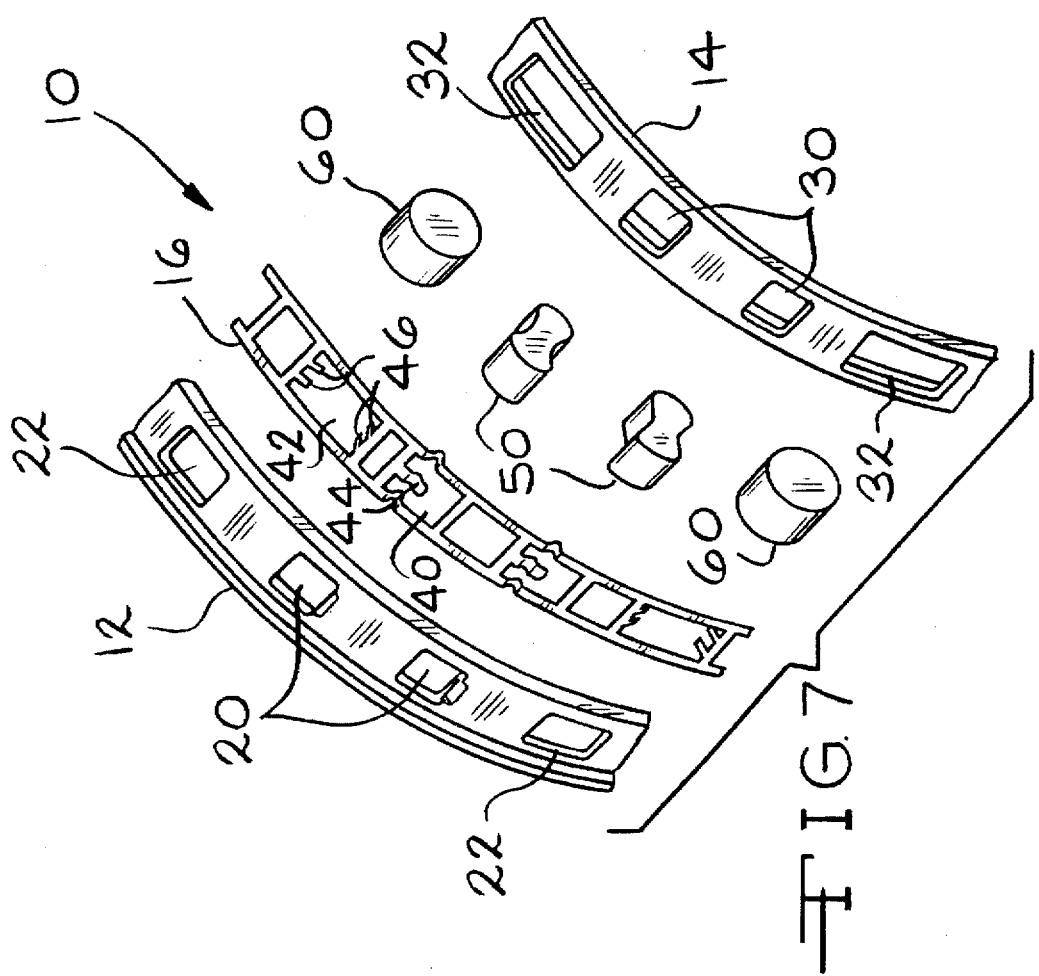
FIG. 7 is an exploded view of a portion of the sprag and roller one-way clutch assembly according to the present invention.
Figure 8:
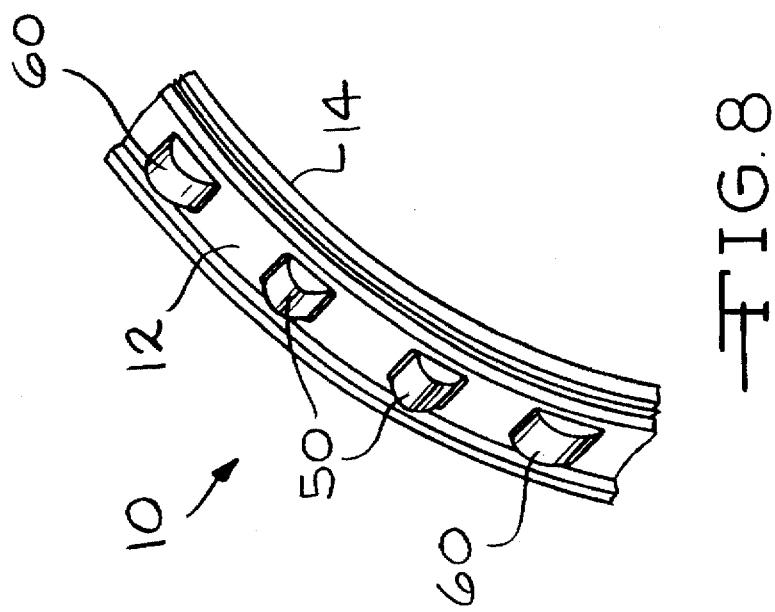
FIG. 8 is a perspective view of a portion of the sprag and roller one-way clutch assembly according to the present invention.

Referring to FIGS. 1, 7 and 8, the assembly 10 includes an outer cage 12, an inner cage 14 and a ribbon spring 16. As shown in FIGS. 1, 4, 5 and 6, the outer cage 12 has a generally circular configuration, The outer cage 12 defines a plurality of sprag openings 20 and roller openings 22. As described below, the sprag openings 20 receive sprags and the roller openings 22 receive rollers. As shown in FIG. 6, the roller openings 22 have a cylindrically shaped wall 24 for receiving a roller. The outer cage 12 can be made from a variety of materials, with a polymer material being preferred. Fiber reinforcements provide additional strength to the polymer material. It has been found that a fiber glass reinforced nylon is especially suitable for the manufacture of the outer cage 12. This type of material allows the outer cage 12 to be resilient yet flexible enough to move with respect to the sprags and rollers. This is especially important so that the outer cage 12 can engage or "capture" the rollers.

Referring to FIGS. 1 and 7, the inner cage 14 has a generally circular configuration, which corresponds to the configuration of the outer cage 12. The inner cage 14 defines a plurality of sprag openings 30 and roller openings 32, which correspond to the sprag and roller openings 20 and 22 defined by the outer cage 12. Each of the roller openings 32 defined by the inner cage 14 includes a cylindrically shaped wall 34 for receiving a roller. The inner cage 14 can be made from a variety of materials, with an unfilled polymer material being preferred. An unfilled nylon is an especially suitable material for the manufacture of the inner cage 14. Various metals can also be used to manufacture the inner cage 14.

Referring to FIGS. 1, 2, 3 and 7, the ribbon spring 16 of the assembly 10 defines a plurality of sprag windows 40 and roller windows 42. The ribbon spring 16 defines a sprag tab 44 in each of the sprag windows 40. The sprag tabs 44 maintain the sprags in proper position in the assembly 10.

The ribbon spring 16 defines a plurality of roller tabs 46 in each of the roller windows 42. In the present embodiment, there are four roller tabs 46 in each of the roller windows 42. The roller tabs 46 are in contact with the rollers to maintain the rollers in proper position in the assembly 10. As shown in FIG. 2, the roller tabs 46 extend inwardly from the ribbon spring 16. As shown in FIGS. 1 and 7, the ribbon spring 16 has a generally circular configuration that corresponds to the circular configurations of the outer and inner cages 12 and 14. The ribbon spring 16 can be made from a variety of materials, with metal being preferred.

Referring to FIGS. 1, 7 and 8, the assembly 10 includes a plurality of spaced sprags 50 extending between and through the corresponding sprag openings 20 and 30 defined by the outer and inner cages 12 and 14, respectively. The sprags 50 extend through the corresponding sprag windows 40 defined by the ribbon spring 16. The sprags 50 can include a variety of shapes, with the conventional shape shown in the present drawings being preferred. The sprags 50 can be made from a variety of materials, with metal being preferred.

Still referring to FIGS. 1, 7 and 8, the assembly 10 includes a plurality of spaced rollers 60 extending between and through the corresponding roller openings 22 and 32 defined by the outer and inner cages 12 and 14, respectively. When so positioned, the rollers 60 are in rolling engagement with the cylindrically shaped walls 24 and 34 of the roller openings 22 and 32, respectively. The rollers 60 extend through the corresponding roller windows 42 defined by the ribbon spring 16. The rollers 60 are in rolling engagement with the roller tabs 46 defined by the ribbon spring 16 in the roller windows 42. Each of the rollers 60 has a generally cylindrical configuration as shown in the drawings. The rollers 60 can be made from a variety of materials, with metal being preferred.

It should be understood that any number of sprags 50 can be used with any number of rollers 60 in the assembly 10 depending on the application for the assembly. However, it has been found that an assembly having sixteen sprags 50 and eight rollers 60 is preferred. As shown in FIG. 1, the eight rollers 60 are equally spaced along the assembly 10. Two sprags 50 are positioned between each pair of rollers 60.

Still referring to FIG. 1, the assembly 10 is positioned in the space 74 defined by an outer race 70 and an inner race 72 of a clutch. The outer and inner races 70 and 72 each has a generally circular configuration corresponding to the circular configurations of the outer and inner cages 12 and 14 and the ribbon spring 16. The inner race 72 can move in the direction indicated by the arrows in FIG. 1. When the inner race 72 moves in the direction indicated by the arrows, the assembly 10 is in a normal freewheel position. The sprags 50 are each movable between a freewheel position in which the inner cage is free to rotate and a locked position in which the inner cage is restricted in rotation. This restriction in rotation allows the clutch to exert torque. During rotation of the inner race 72, the rollers 60 also rotate. The rollers 60 act as bearings to support the outer and inner races 70 and 72 during rotation. The rollers 60 control the eccentricities of the outer and inner races 70 and 72.

As shown in FIG. 1, lubricating oil 80 is positioned in the space 74 defined by the outer and inner races 70 and 72 adjacent the assembly 10. The rollers 60 move or redistribute the lubricating oil 80 from the outer race 70 to the inner race 72 as the rollers 60 move in the direction indicated by the arrows in FIG. 1. This provides for even distribution of the lubricating oil between the races 70 and 72 and throughout the assembly 10. This ensures superior lubrication of the outer and inner races 70 and 72.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. A sprag and roller one-way clutch assembly (10) for use with a clutch having an outer race (70) and an inner race (72) adjacent lubricating oil (80), comprising:

a polymeric outer cage (12) and an inner cage (14), each of said cages (12, 14) defining a plurality of corresponding sprag and roller openings (20, 30, 22, 32), each of said roller openings (22, 32) having a substantially cylindrical including a cylindrically shaped wall (24, 34);

a ribbon spring (16) positioned between said outer and inner cages (12, 14), said ribbon spring (16) defining a plurality of corresponding sprag and roller windows (40, 42), said ribbon spring (16) defining a plurality of inwardly extending roller tabs (46) adjacent each of said roller windows (42);

a plurality of spaced sprags (50) extending between and through said corresponding sprag openings (20, 30) defined by said outer and inner cages (12, 14) and through said corresponding sprag windows (40) defined by said ribbon spring (16), each of said sprags (50) being movable between a freewheel position in which at least one of said races (70, 72) is free to rotate and a locked position in which rotation of said races (70, 72) is restricted; and a plurality of spaced substantially cylindrical rollers (60) extending between and through said corresponding roller openings (22, 32) defined by said outer and inner cages (12, 14) and through said corresponding roller windows (42) defined by said ribbon spring (16), each of said rollers (60) being in rolling engagement with said cylindrically shaped walls (24, 34), each of said rollers (60) being in rolling engagement with said roller tabs (46) defined by said ribbon spring (16), each of said rollers (60) acting as a bearing to support said outer and inner races (70, 72) during rotation, said rollers (60) moving said oil (80) from said outer race (70) to said inner race (72) during rotation of said inner race (72).

2. The invention of claim 1, wherein said outer cage (12) includes fiber reinforcements.

3. The invention of claim 1, wherein said inner cage (14) consists of a polymer material.

4. The invention of claim, 3, wherein said polymer material of said inner cage (14) is unfilled.

* * * * *

UNITED STATES PATENT AND TRADEMARK OFFICE
CERTIFICATE OF CORRECTION

PATENT NO. : 5,676,226
DATED : October 14, 1997
INVENTOR(S) : Marcia L. Lampela et al.

It is certified that error appears in the above-identified patent and that said Letters Patent is hereby corrected as shown below:

Col. 1, line 44, delete the comma (,) between the words "cages" and "The" and insert -- . --.

Col. 2, line 36, delete the comma (,) between the words "configuration" and "The" and insert -- . --.

Col. 2, line 58, delete the word "untilled" and insert the word -- unfilled --.

Col. 2, line 59, delete the word "untilled" and insert the word -- unfilled --.

Col. 4, lines 23 and 24, delete the words "having a substantially cylindrical".

Signed and Sealed this

Twenty-third Day of December, 1997

Attest:

BRUCE LEHMAN

Attesting Officer

Commissioner of Patents and Trademarks